J. SIMS.
SEED DRILL.
No. 32,792. Patented July 9, 1861.
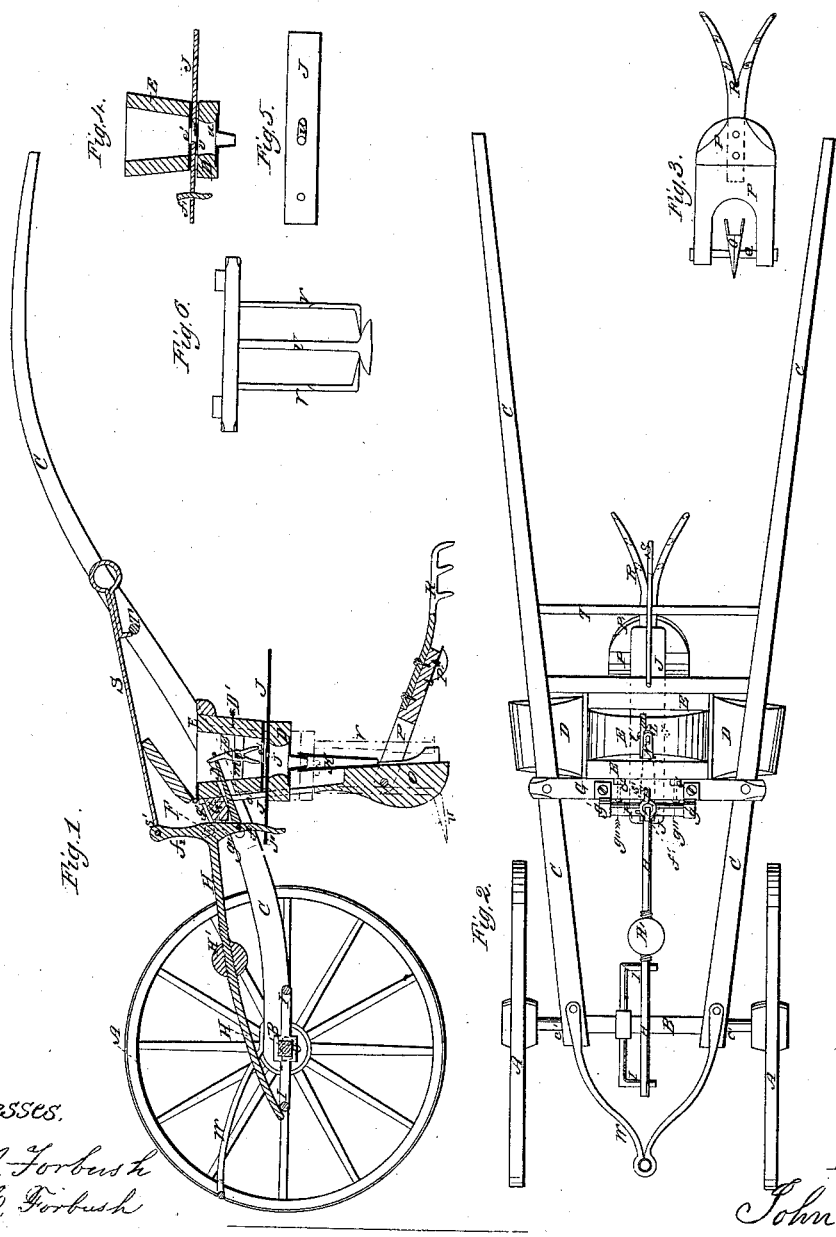

UNITED STATES PATENT OFFICE.

JOHN SIMS, OF BOSTON CORNERS, NEW YORK.

IMPROVEMENT IN SEED-DRILLS.

Specification forming part of Letters Patent No. 32,792, dated July 9, 1861.

*To all whom it may concern:*

Be it known that I, JOHN SIMS, of Boston Corners, Erie county, and State of New York, have invented certain new and useful Improvements in Combined Seed-Drill and Cultivator; and I do hereby declare that the following is a full, clear, and exact description thereof, reference being had to the accompanying drawings and the letters of reference marked thereon, in which—

Figure I is a longitudinal section of my improvement. Fig. II is a plan of the same. Fig. III is a bottom plan of the plow-coverer and rake. Fig. IV is a section of seed-box and slide for planting corn, &c., in hills. Fig. V is a plan of slide for same. Fig. VI is a front elevation of the cultivator.

Letters of like name and kind refer to like parts in each of the figures.

A A represent the main supporting-wheels, having a common axle, B. They are movable on the axle and may be placed such distance apart as the required distance between the rows to be planted, the track of the wheels serving as marks for the rows.

C represents handles for guiding the machine, which may also be considered as the frame-work. These are hinged to the axle, as shown at $c'$.

D is a cross-piece for supporting the seed-box and plow. It is connected to hangers which drop down from the handles, as shown by the dotted lines D$'$.

E represents the seed-box. It has a slot or aperture, $e'$, through its bottom, through which the seed drop onto the slide.

F is a rock-shaft, which is supported upon the cross-piece G by brackets, as shown at $g'$, and having two projecting arms, $f'$ and $f^2$.

H is a weighted lever, which is connected with the rock-shaft and projects therefrom and reaches over the axle of the supporting-wheels in a manner to be lifted by the bent arms or lifters I, which are made fast to the axle and revolve with it.

H$'$ is a ball or weight upon the lever, which may be moved to vary its leverage upon the rock-shaft.

J is a slide, which works under the bottom of the seed-box. It has a proper aperture, J$'$, through it, which, when it comes opposite the aperture $e'$ in the seed-box, allows the seeds to pass through into the conducting-tube K. It is connected to the lower end of the arm $f'$ of the rock-shaft, as shown at $j''$, so that the rock-shaft will communicate a horizontal movement (to and fro) to the slide.

L is a fork, which is pivoted to the cross-piece $m$, as shown at $l'$.

N is a connecting-rod, which connects the fork to the arm $f'$ of the rock-shaft. As the supporting-wheels revolve and the machine progresses, the bent arms I will lift the lever to the highest position, and as they pass away from the lever, the lever, by its own weight, goes down with the arm until the other arm strikes the lever and again lifts it. This communicates motion to the rock-shaft, and from thence, through the arm $f'$ and connecting-rod N, to the slide and fork, so that the slide and fork have alternate movements in opposite directions. The fork, thus working in the seed-box directly over the outlet-aperture, will prevent the seeds (although they may be wet or mixed with fertilizers in the seed-box) from clogging the aperture, and hence the operation of the fork and slide will insure a uniform and steady dropping of the seeds in rows.

O represents the drill-plow. It stands in a vertical position and is connected to and supported by the cross-pieces D and G, it having two arms, $o'$, which pass through mortises in the cross-pieces D and G, and held by the pins $g''$, passing through the cross-piece G and the ends of the arms, which pins may be removed and the plow disconnected at pleasure. It is of peculiar construction. Its front or opening edge is curved and the sides gradually expanding to its full width, while its back is grooved to form a channel or way in connection with the tube for the seeds to follow into the open furrow.

P is the coverer-board, which is hinged to the plow, as shown at Q, and P$'$ is the coverer, made of iron in the proper form, and fastened to the board.

R is a pronged rake or harrow, which is connected to the coverer-board, and drags in rear, and rakes, harrows, and smooths over the ground after the coverer.

S is a rod having a hook thereon, and connected to the arm $f^2$ of the rock-shaft, as shown at $s'$, for the purpose of lifting and holding the weighted lever above the reach of the revolving arms I, when it is desired to move the machine without planting the seeds. For this purpose the rod hooks onto the cross-rod T of the handles.

The seed-box (represented in Fig. IV) and slide (represented in Fig. V) are for the purpose of planting corn or other seeds in hills. When used, they are placed in the same position as the others already described, and are worked in the same manner, except the fork is not used. The slide has a recess or cavity, $u$, connecting with the hole through which the kernels drop, which recess is of proper size to hold the requisite number of kernels for each hill. There is a cross-piece, $v$, placed under the side, which partially covers the opening into the tube. When the hole in the slide, in its movement, passes this cross-piece, the kernels are dropped into the tube and thence into the furrow.

The cultivator attachment (represented in Fig. VI) is composed of one center shovel-plow, U, with side cutters, V. When this is used, the drill-plow, coverer, and rake (represented in Figs. I, II, III) are moved, as before described, and the cultivator attached by bolts to the cross-piece D, as shown by the dotted red lines in Fig. I. The machine is thus adapted to the usual purposes of a cultivator.

W represents the draft-bar.

From this description it will be seen that my improvements are adapted to planting different kinds of seeds in rows or hills, as may be desired, and that the operation of the fork and slide will prevent the seeds from clogging in the passage-way from the seed-box to the conducting-tube, although the seeds may be wet or mixed with fertilizers, and that the track of the wheels will mark the line for the rows. It will also be seen that the machine is so constructed as also to serve the purpose of a cultivator, thus making a combined seed-drill and cultivator.

By connecting a manure-box with a tube, similar to the tube K, in front of the seed-box, the machine may be made to deposit manure by the same motion of the lever H and rock-shaft F which drops the seed, the slide J being lengthened and having a proper aperture for that purpose.

I claim—

The arrangement of the fork L, slide J, rock-shaft F, and seed-box E, in combination with the drill-plow O, coverer P', and rake R, for the purposes and substantially as described.

JOHN SIMS.

Witnesses:
E. B. FORBUSH,
W. H. FORBUSH.